US006315328B1

United States Patent
Iseki et al.

(10) Patent No.: US 6,315,328 B1
(45) Date of Patent: Nov. 13, 2001

(54) SHOULDER ANCHOR FOR SEAT BELT DEVICE

(75) Inventors: Hideo Iseki; Muneo Nishizawa, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/455,920

(22) Filed: Dec. 7, 1999

(30) Foreign Application Priority Data

Dec. 17, 1998 (JP) .................................................. 10-359321

(51) Int. Cl.$^7$ .................................................. B60R 22/00
(52) U.S. Cl. ........................................... 280/808; 297/482
(58) Field of Search ........................... 280/801.1, 801.2, 280/808; 297/483, 482, 468

(56) References Cited

U.S. PATENT DOCUMENTS

| | | | |
|---|---|---|---|
| 3,959,855 | * | 6/1976 | Fisher ............................ 280/808 X |
| 4,480,583 | * | 11/1984 | Ando et al. ........................ 280/801.1 |
| 5,037,135 | * | 8/1991 | Kotikovsky et al. ................ 280/808 |
| 5,257,820 | * | 11/1993 | Kosugi ................................ 280/808 |
| 5,280,959 | * | 1/1994 | Nanbu ................................ 280/808 |
| 5,601,311 | * | 2/1997 | Pfeiffer et al. .................... 280/801.1 |
| 5,790,931 | * | 8/1998 | Tsuji et al. . |
| 5,863,071 | * | 1/1999 | Li-Calso ............................ 280/801.1 |
| 6,120,061 | * | 9/2000 | Ito ...................................... 280/808 |
| 6,138,328 | * | 10/2000 | Iseki ................................ 280/808 X |

FOREIGN PATENT DOCUMENTS

| | | | |
|---|---|---|---|
| 55160449 | * | 12/1980 | (JP) . |
| 9303530 | * | 12/1980 | (JP) . |
| 1195192 | * | 8/1989 | (JP) . |
| 71495 | * | 1/1995 | (JP) . |

\* cited by examiner

*Primary Examiner*—Brian L. Johnson
*Assistant Examiner*—Bryan Fischmann
(74) *Attorney, Agent, or Firm*—Kanesaka & Takeuchi

(57) ABSTRACT

A shoulder anchor used in a seat belt device for guiding a webbing is formed of an insertion metal member having a guide hole for allowing the webbing to pass therethrough, and a resin molded portion molded on at least a predetermined area of the insertion metal member. The resin molded portion includes a guide portion for guiding the webbing and a shrinkage absorbing portion disposed in a part of the guide portion for absorbing shrinkage or reducing residual stress of a resin of the resin molded portion. By providing the cut-out portion, shrinkage of the resin during molding can be effectively absorbed, thereby improving appearance of the resin molding.

6 Claims, 7 Drawing Sheets

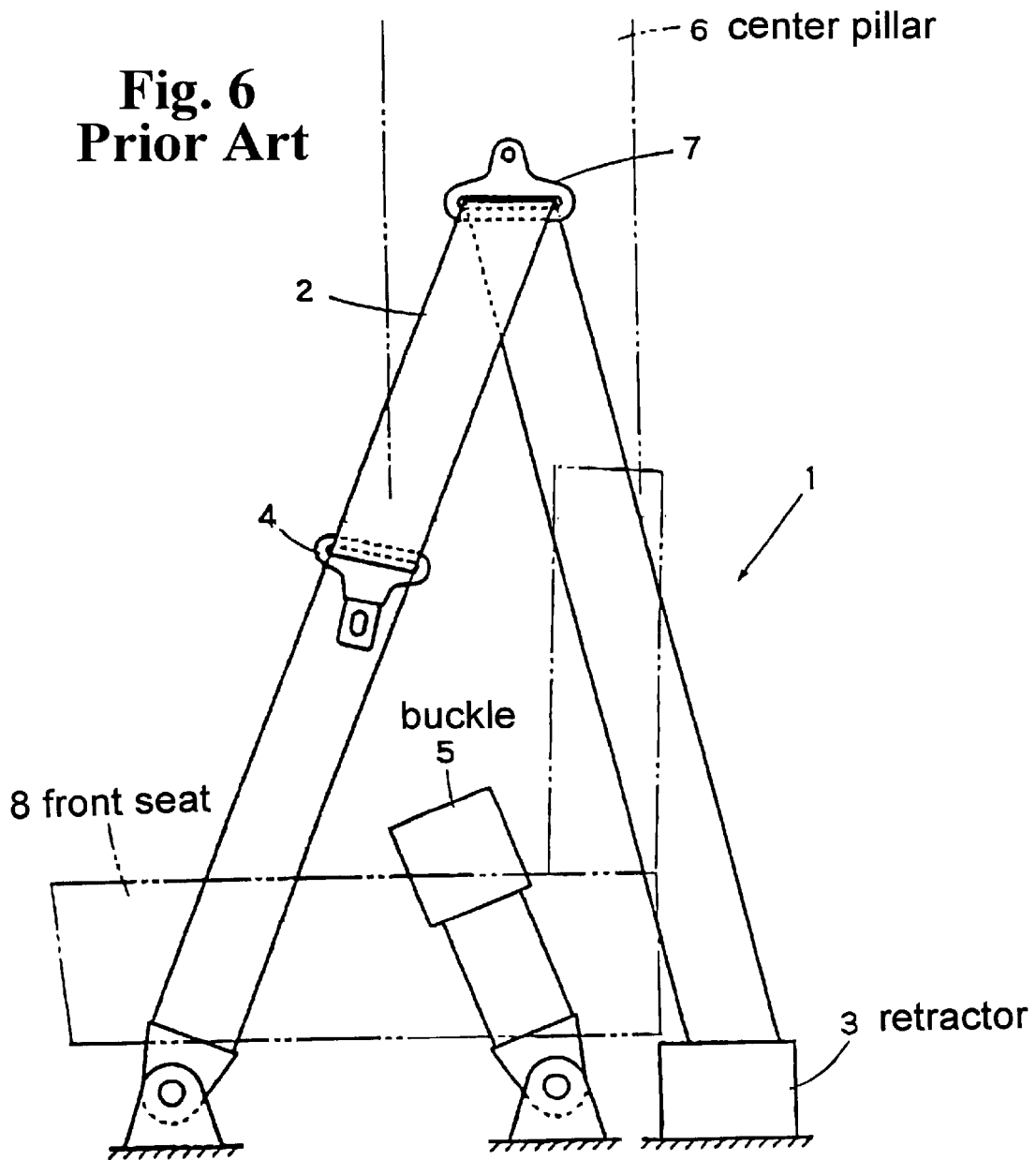

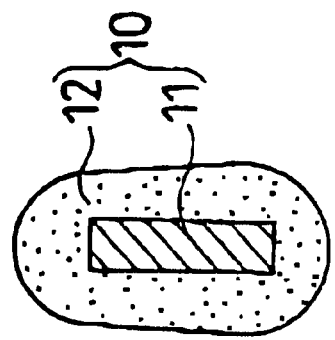
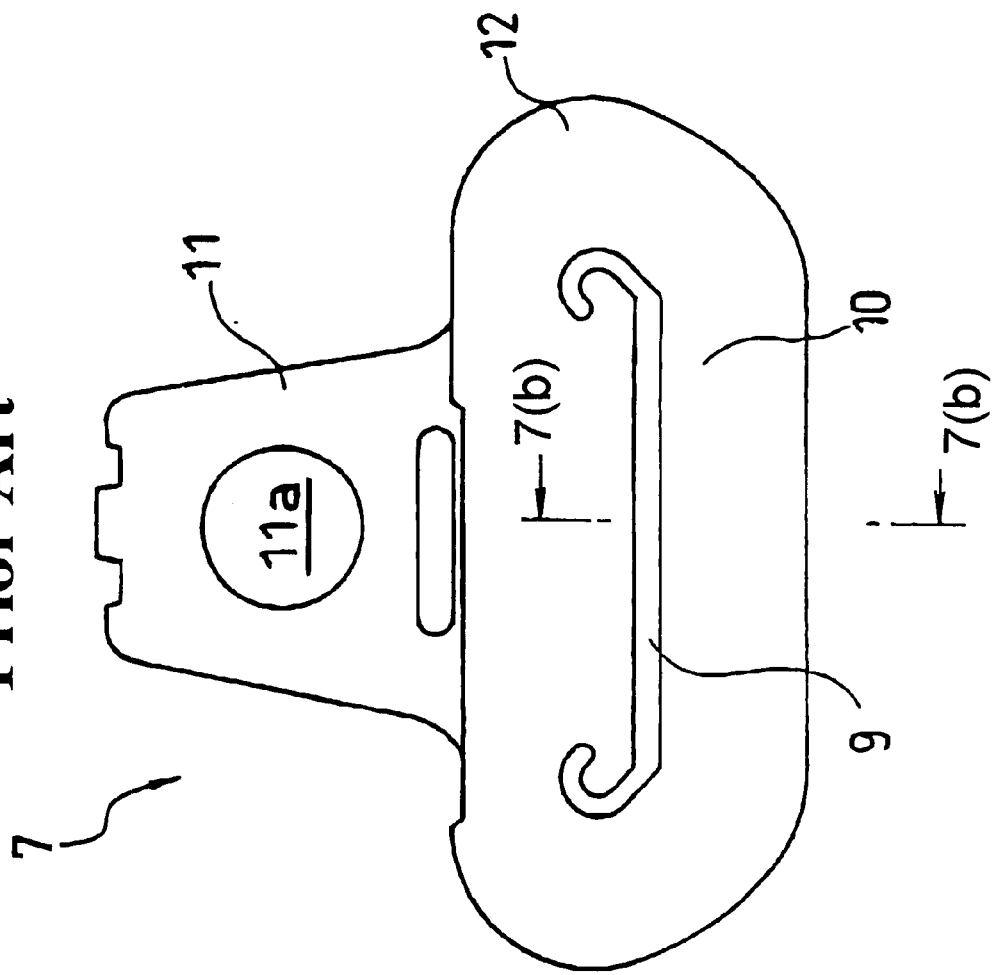

SHOULDER ANCHOR FOR SEAT BELT DEVICE

BACKGROUND OF THE INVENTION AND RELATED ART STATEMENT

The present invention relates to a shoulder anchor or deflection fitting for guiding a seat belt webbing to restrain an occupant sitting on a vehicle seat into a proper position for protecting the occupant.

A seat belt device is installed in a vehicle, or automobile, to restrain an occupant by means of a webbing in the event of vehicle collision, thereby protecting an occupant from injury due to collision with a vehicle body.

As schematically shown in FIG. 6, a typical conventional seat belt device 1 comprises a seat belt webbing 2, one end of which is fixed to a vehicle body, a retractor 3 for winding the other end side portion of the seat belt webbing 2, a tongue 4 slidably attached to the seat belt webbing 2, a buckle 5 fixed to the vehicle body and detachably engaged with the tongue 4, and a shoulder anchor or deflection fitting 7 supported at a center pillar 6 of the vehicle body for guiding the seat belt webbing 2 slidably in a longitudinal direction thereof.

When the seat belt device 1 is not used, the seat belt webbing 2 is completely wound by the retractor 3 to prevent looseness of the seat belt webbing 2. When the seat belt device 1 is used, the seat belt webbing 2 is smoothly withdrawn from the retractor 3.

The shoulder anchor 7 guides the seat belt webbing 2 for restraining an occupant sitting on for example a front seat 8 into a proper position.

The shoulder anchor 7 of the conventional seat belt device has a guide portion 10 defining a guide hole 9 through which the webbing 2 is slidably inserted. In order to slide the webbing 2 smoothly and support the inertial force of the occupant in the event of emergency, resin 12, such as polyacetal resin (POM), is molded over a predetermined area of an insertion metal 11 including the guide portion 10, as shown in FIGS. 7(a) and 7(b). The insertion metal 11 is provided with a mounting hole 11a formed in an area where the resin molding is not formed.

However, since the resin material has a relatively large contraction property, the molded resin shrinks after molding, thus deteriorating the appearance of the resin molding.

The present invention has been made to solve the above problem, and an object of the present invention is to provide a shoulder anchor or deflection fitting in which forming ability of resin molding is improved by effectively absorbing shrinkage, i.e. reducing residual stress, of the molded resin in resin-molding a guide portion of a webbing.

Further objects and advantages of the invention will be apparent from the following description of the invention.

SUMMARY OF THE INVENTION

To solve the aforementioned objective a shoulder anchor or deflection fitting used in a seat belt device for guiding a webbing according to a first aspect of the invention comprises an insertion metal and a resin molded portion. The resin molded portion is formed by molding resin at least over a predetermined area of the insertion metal including a guide portion for guiding the webbing, and the resin molded portion is provided with a shrinkage absorbing portion, disposed in a portion corresponding to the guide portion, for absorbing shrinkage, i.e. reducing residual stress of the resin molded portion.

In the shoulder anchor according to a second aspect of the invention, the shrinkage absorbing portion is formed of a cut-out portion formed in the resin molded portion.

In the shoulder anchor according to a third aspect of the invention, the shrinkage absorbing portion is formed of at least one shrinkage absorbing member disposed in the resin molded portion.

In the shoulder anchor according to the present invention structured as mentioned above, since the shrinkage absorbing portion for absorbing shrinkage of the resin is disposed in the molded resin portion corresponding to the guide portion, shrinkage or residual stress of the resin during the molding can be effectively absorbed or reduced by the shrinkage absorbing portion, thereby improving the quality of the resin molding in the shoulder anchor.

BRIEF DESCRIPTION OF THE DRAWINGS

FIGS. 1(a) and 1(b) show one embodiment of a shoulder anchor or deflection fitting according to the present invention, wherein FIG. 1(a) is a front view and FIG. 1(b) is a sectional view taken along line 1(b)—1(b) in FIG. 1(a);

FIGS. 2(a)–2(c) show another embodiment of the present invention, wherein FIG. 2(a) is a front view, FIG. 2(b) is a sectional view taken along line 2(b)—2(b) in FIG. 2(a), and FIG. 2(c) is a view as seen from an arrow 2(c) in FIG. 2(a):

FIGS. 5(a)–5(c) show a still further embodiment of the present invention, wherein FIG. 5(a) is a front view, FIG. 5(b) is a sectional view taken along line 5(b)—5(b) in FIG. 5(a), and FIG. 5(c) is a sectional view taken along line 5(c)—5(c) in FIG. 5(a);

FIG. 6 is a view schematically showing a conventional seat belt device; and

FIGS. 7(a) and 7(b) show a conventional shoulder anchor, wherein FIG. 7(a) is a front view, and FIG. 7(b) is a sectional view taken along line 7(b)—7(b) in FIG. 7(a).

DETAILED DESCRIPTION OF PREFERRED EMBODIMENTS

Hereinafter, embodiments of the present invention will be described with reference to the attached drawings.

Figure 1B:
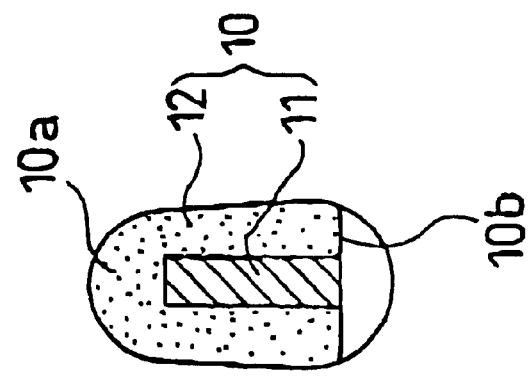
Figure 1A:
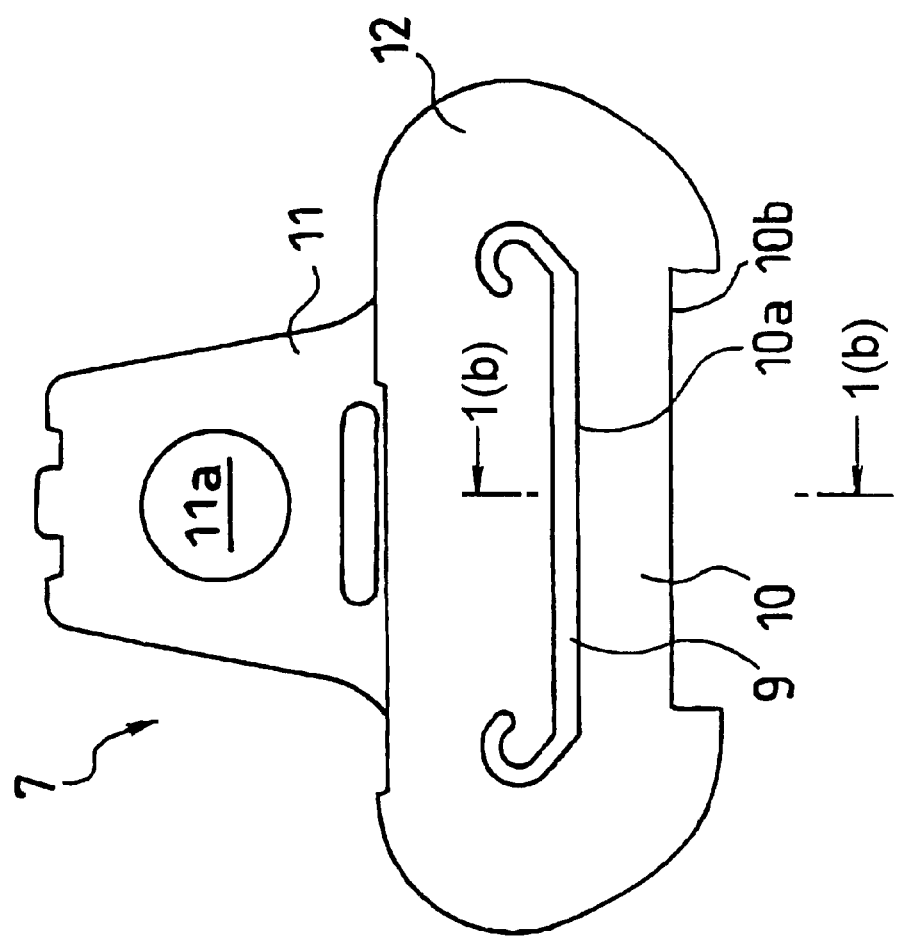

FIGS. 1(a) and 1(b) show one embodiment of a shoulder anchor or deflection fitting according to the present invention, in which FIG. 1(a) is a front view and FIG. 1(b) is a sectional view taken along line 1(b)—1(b) in FIG. 1(a). In this embodiment, the same components as the aforementioned conventional components are designated by the same numerals so that the detailed description will be omitted.

As shown in FIG. 1(a) and FIG. 1(b), a shoulder anchor or deflection fitting 7 of this embodiment has a guide portion 10 for a webbing 2. The guide portion 10 is provided with a webbing sliding portion 10a, and a cut-out portion 10b which is disposed on a side opposite to the webbing sliding portion 10a and is formed by cutting out the resin 12. In this case, the length of the cut-out portion 10b along the webbing width direction is substantially equal to the length of the guide portion 10 along the width direction of the webbing. The cut-out portion 10b extends through the guide portion 10 in a direction perpendicular to the webbing width direction, and one edge, i.e. lower edge in the drawing, of the insertion metal 11 is exposed. The cut-out portion 10b forms a shrinkage absorbing portion of the present invention.

The other structures of the shoulder anchor 7 of this embodiment are the same as those of the conventional shoulder anchor 7.

In the shoulder anchor 7 of this embodiment structured as mentioned above, since the guide portion 10 is provided with the cut-out portion 10b in the resin 12, the shrinkage of the resin 12 during the molding can be effectively absorbed by the cut-out portion 10b, thereby improving the appearance of the resin molding in the shoulder anchor 7.

The other operations and effects of the shoulder anchor 7 of this embodiment are the same as those of the conventional shoulder anchor 7.

Figure 2B:
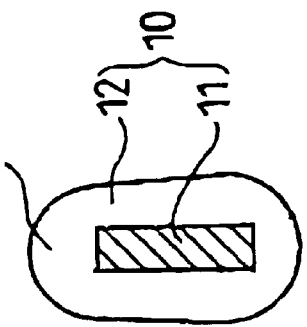
Figure 2C:
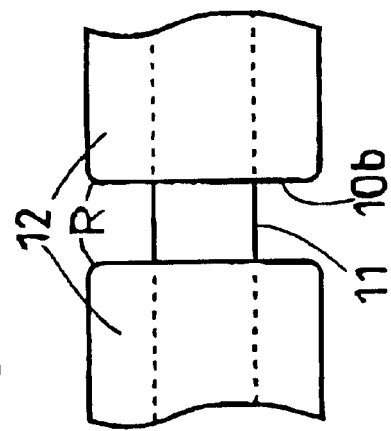
Figure 2A:
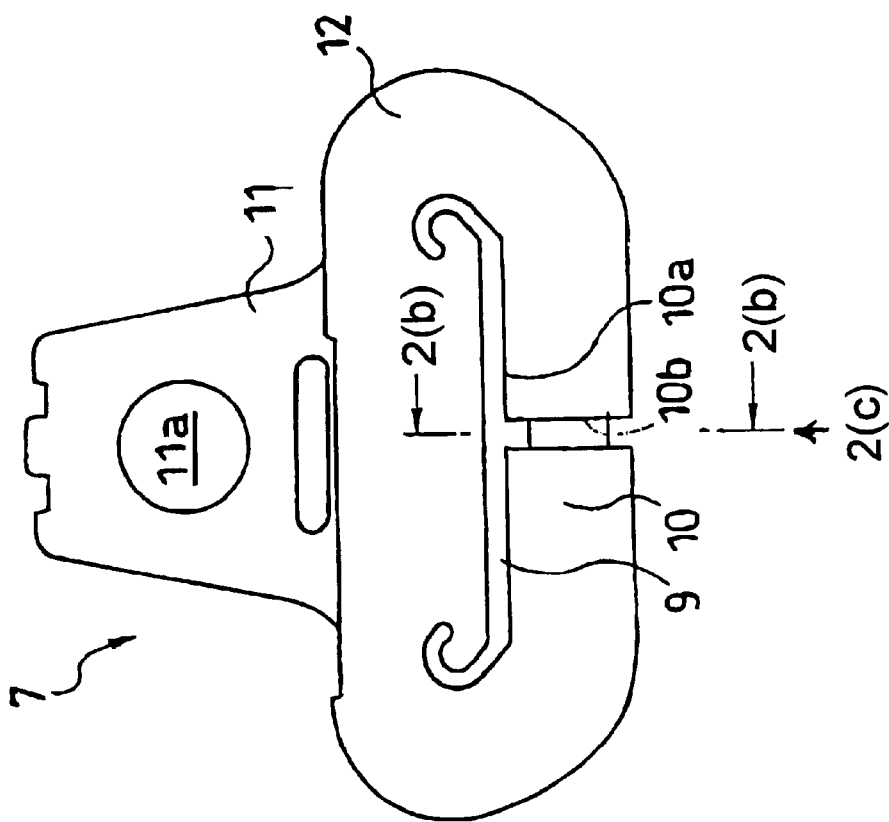

FIGS. 2(a)–2(c) show another embodiment of the present invention, in which FIG. 2(a) is a front view, FIG. 2(b) is a sectional view taken along line 2(b)—2(b) in FIG. 2(a), and FIG. 2(c) is a view as seen from an arrow 2(c) in FIG. 2(a). Also, in this embodiment, the same components as in the aforementioned conventional shoulder anchor are designated by the same numerals.

In the shoulder anchor 7 of the aforementioned embodiment, the cut-out portion 10b is formed to have the same length along the webbing width direction as the length of the guide portion 10 along the webbing width direction and to expose the lower edge of the insertion metal 11. On the other hand, in the shoulder anchor of this embodiment, a cut-out portion 10b is formed at the center of the webbing width direction of a guide portion 10 as shown in FIG. 2(a). In this case, the cut-out portion 10b is formed to have a length along the webbing width direction significantly shorter than that of the aforementioned embodiment and to expose the full circumference of one portion of an insertion metal 11, as shown in FIG. 2(b). As shown in FIG. 2(c), the edges R of the resin 12 forming the cut-out portion 10b are rounded, thereby preventing the webbing from being damaged by the edges of the resin 12 even when the cut-out portion 10b is formed in a webbing sliding portion 10a of the guide portion 10.

The other operations and effects of the shoulder anchor 7 of this embodiment are the same as those of the aforementioned embodiments.

The length and configuration of the cut-out portion 10b are not limited to the aforementioned embodiments and can be freely set. It is not necessary to expose one edge or the full circumference of one portion of the insertion metal 11 and these portions may be covered by a resin. Namely, it is only necessary to provide the cut-out portion 10b which can absorb shrinkage of a resin during molding.

Figure 3:
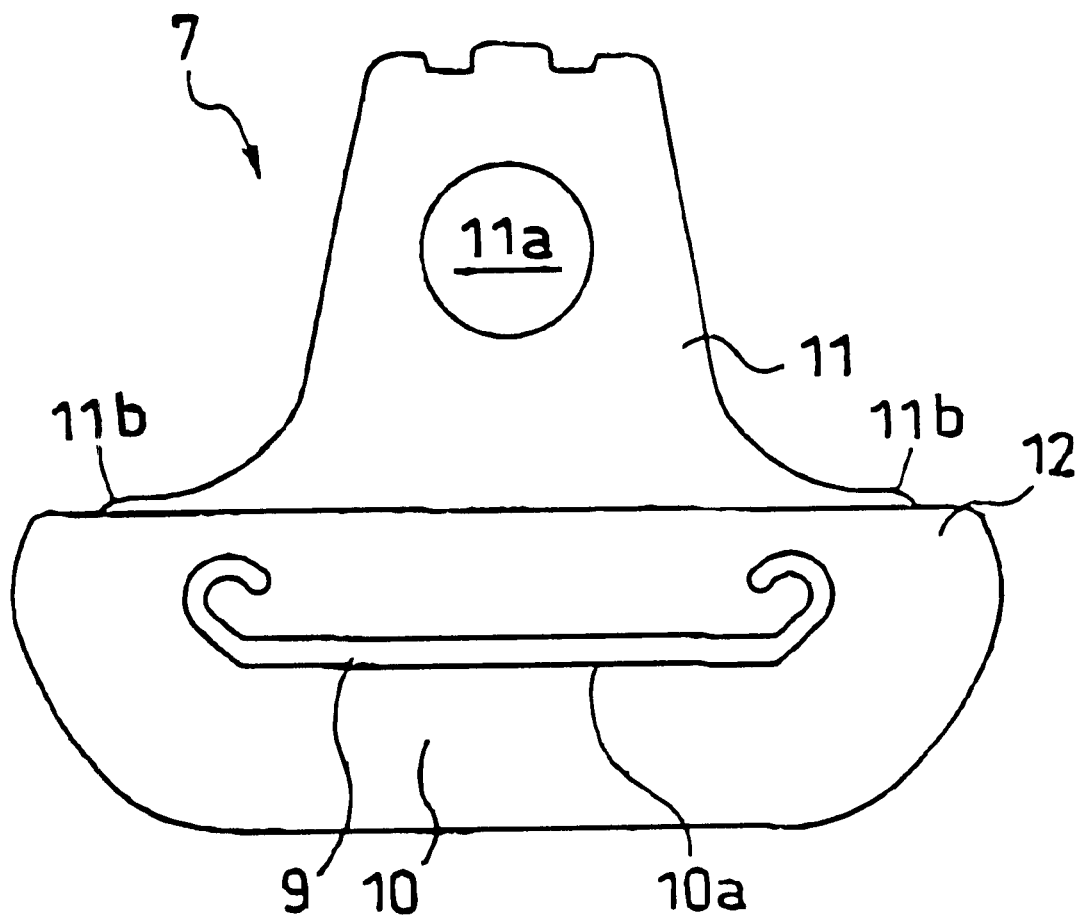
FIG. 3 is a front view showing a further embodiment of the present invention.

FIG. 3 is a front view showing another embodiment of the present invention. Also in this embodiment, the same components as in the aforementioned conventional one are designated by the same numerals.

As shown in FIG. 3, in a shoulder anchor 7 of this embodiment, resin 12 is molded on an insertion metal 11 to expose shoulders 11b of the insertion metal 11. In this case, the exposed portions extend over the front and back surfaces of the shoulders 11b. The resin 12 is molded not to cover the shoulders 11b of the insertion metal 11, thereby preventing problems of the resin molding, such as deformation, and thus improving the appearance of the resin molding.

The other operations and effects of the shoulder anchor 7 of this embodiment are the same as those of the aforementioned embodiments.

Figure 4:
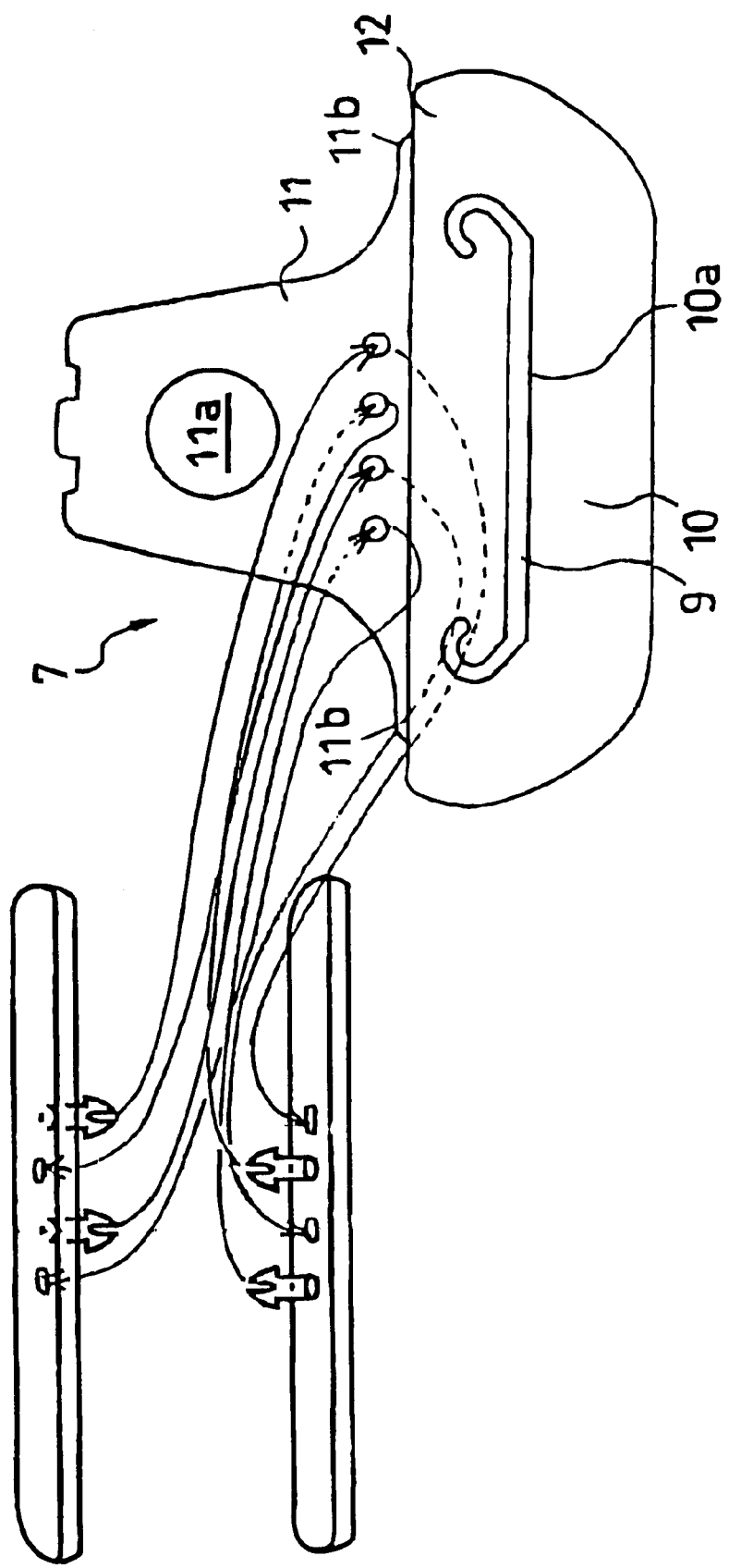
FIG. 4 is a view showing an alternative example of the embodiment shown in FIG. 3.

FIG. 4 is a view showing an alternative example of the embodiment shown in FIG. 3.

In the shoulder anchor 7 of the embodiment shown in FIG. 3, the shoulders 11b are exposed because the resin is not molded on the shoulders 11b of the insertion metal 11. In this alternative example, the shoulder anchor 7 is further provided with a pair of covers to be attached to the shoulders 11b of the insertion metal 11 in order to cover the front and back surfaces of the shoulders 11b, respectively. In this case, a pair of the covers is attached to the shoulder anchor 7 to sandwich the insertion metal 11 by inserting and engaging clips formed on one cover to engaging holes formed in the other cover through mounting holes formed in the insertion metal 11 and by inserting and engaging clips formed on the other cover to engaging holes formed in the one cover through mounting holes formed in the insertion metal 11. The covers are provided to cover the shoulders 11b of the insertion metal 11 as described above, thereby improving the appearance of the shoulder anchor 7.

Though the clips of the respective covers are inserted into and engaged with the engaging holes of the corresponding covers through the mounting holes of the insertion metal in the aforementioned example, the clips of the covers may be inserted into and engaged directly with the mounting holes of the insertion metal 11.

Though the covers are attached to the shoulder anchor by inserting and engaging the clips of one cover to the engaging holes of the other cover in the aforementioned example, one of the covers may be provided with legs and the legs may be welded to the other cover to attach the covers to each other. In this case, the welding may be high frequency welding.

Though the resin is not molded on the front and back surfaces of the shoulders 11b of the insertion metal 11 in the above example, the resin may not be molded on only one of the front and back surfaces of the shoulders 11b of the insertion metal 11. When the resin is not molded on only one of the surfaces of the shoulders 11b of the insertion metal 11, one cover may be used to cover the other surfaces of the shoulders 11b.

Further, the cut-out portions 10b in the aforementioned embodiments may be combined suitably. The combination of the cut-out portions 10b of the embodiments can further effectively absorb the shrinkage of the resin 12 during the molding, thereby further improving the appearance of the resin molding for the shoulder anchor 7.

Figure 5B:
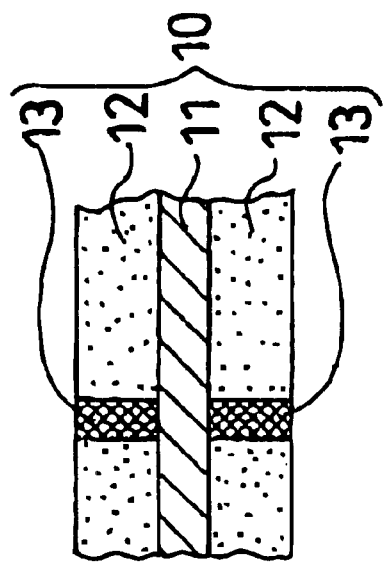
Figure 5C:
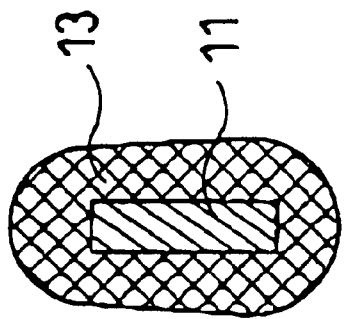
Figure 5A:
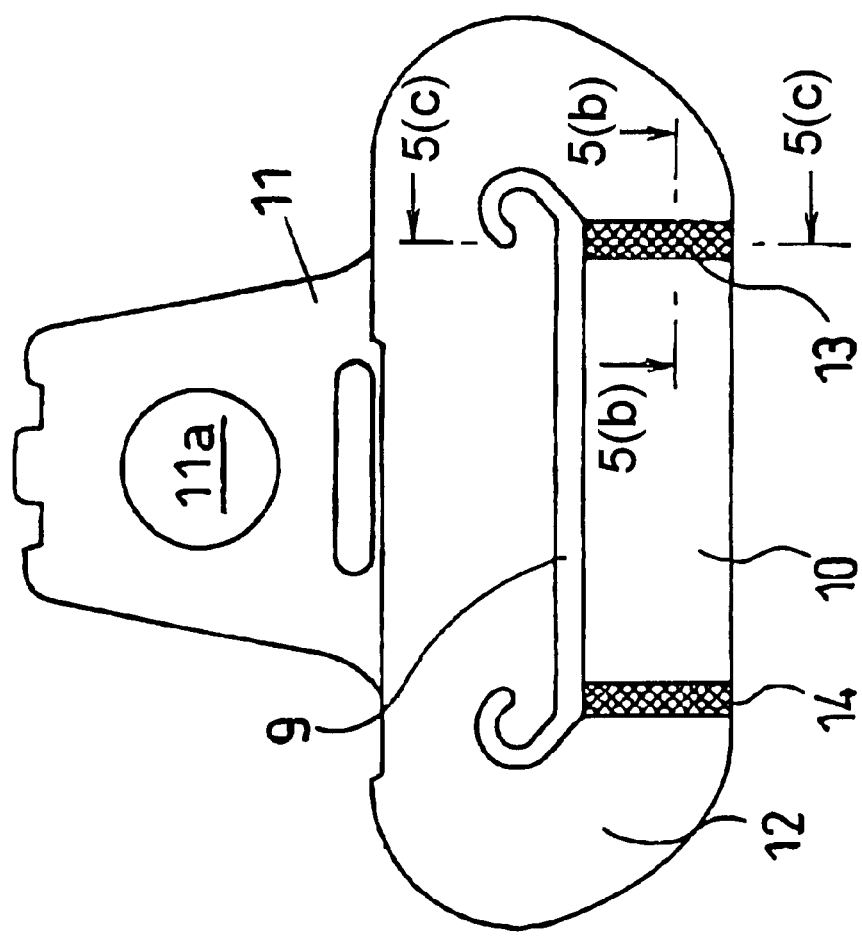

FIGS. 5(a)–5(c) show another embodiment of the present invention in which FIG. 5(a) is a front view and FIG. 5(b) is a sectional view taken along line 5(b)—5(b) in FIG. 5(a). Also, in this embodiment, the same components as the aforementioned conventional one are designated by the same numerals.

As shown in FIG. 5(a), a shoulder anchor 7 of this embodiment is provided with shrinkage absorbing members 13, 14 for absorbing shrinkage of a molded resin during molding, and the shrinkage absorbing members 13, 14 are arranged at both ends of a guide portion 10 so that each shrinkage absorbing member is disposed between the molded resin portions. In this case, as shown in FIGS. 5(b) and 5(c), the shrinkage absorbing members 13, 14 extend over the entire circumstances of portions of the insertion metal 11. The shrinkage absorbing members 13, 14 elastically expand or stretch when the molded resin shrinks, thereby absorbing or allowing shrinkage. The shrinkage absorbing members 13, 14 are, for example, made of urethane rubber. These shrinkage absorbing members 13, 14 compose the shrinkage absorbing portion of the present invention.

The other structures of the shoulder anchor 7 of this embodiment are the same as those of the conventional shoulder anchor 7.

Since the shrinkage absorbing members 13, 14 are arranged at both ends of the guide portion 10 in the shoulder anchor 7 structured as mentioned above, shrinkage of the resin 12 during molding can be effectively absorbed by the shrinkage absorbing members 13, 14. Therefore, the appearance of the resin mold in the shoulder anchor 7 can be improved.

The other operations and effects of the shoulder anchor 7 of this embodiment are the same as those of the conventional shoulder anchor 7.

The shrinkage absorbing member is not limited to the aforementioned embodiment, and additional one may be provided in addition to and between the shrinkage absorbing members at both ends of the guide portion 10. Further, the shrinkage absorbing member may be arranged only at one of the ends of the guide portion 10, only at the center of the guide portion 10, or only between the end and the center.

As apparent from the above description, according to the shoulder anchor or deflection fitting of the present invention, the shrinkage absorbing portion for absorbing shrinkage of the resin is arranged in the resin mold corresponding to the guide portion, so that shrinkage of the resin occurred during molding is absorbed, thereby improving quality of the resin molding in the shoulder anchor.

While the invention has been explained with reference to the specific embodiments of the invention, the explanation is illustrative and the invention is limited only by the appended claims.

What is claimed is:

1. A shoulder anchor used in a seat belt device for guiding a webbing, comprising:

an insertion metal member having a fixing portion to be fixed to a vehicle, a guide hole for allowing the webbing to pass therethrough, a shoulder portion near the guide hole at a side of the fixing portion, and a lower portion situated at a side opposite to the shoulder portion relative to the guide hole, and a resin molded portion molded on at least a predetermined area of the insertion metal member and including a guide portion for guiding the webbing and a shrinkage absorbing portion formed in a part of the guide portion for reducing residual stress of a resin of the resin molded portion, said shrinkage absorbing portion being formed of a cut-out portion formed in the resin molded portion and formed at a lower side of the lower portion so that a lower edge of the insertion metal member is not covered by the resin molded portion.

2. A shoulder anchor used in a seat belt device for guiding a webbing, comprising:

an insertion metal member having a fixing portion to be fixed to a vehicle, a guide hole for allowing the webbing to pass therethrough, a shoulder portion near the guide hole at a side of the fixing portion, and a lower portion situated at a side opposite to the shoulder portion relative to the guide hole, and a resin molded portion molded on at least a predetermined area of the insertion metal member and including a guide portion for guiding the webbing and a shrinkage absorbing portion formed in a part of the guide portion for reducing residual stress of a resin of the resin molded portion, said shrinkage absorbing portion being formed on the lower portion and formed of a cut-out portion formed in the resin molded portion, said cut-out portion having a width less than that of the guide hole and completely surrounding the lower portion.

3. A shoulder anchor used in a seat belt device for guiding a webbing, comprising:

an insertion metal member having a fixing portion to be fixed to a vehicle, a guide hole for allowing the webbing to pass therethrough, a shoulder portion near the guide hole at a side of the fixing portion, and a lower portion situated at a side opposite to the shoulder portion relative to the guide hole, and a resin molded portion molded on at least a predetermined area of the insertion metal member and including a guide portion for guiding the webbing and a shrinkage absorbing portion formed in a part of the guide portion for reducing residual stress of a resin of the resin molded portion, said shrinkage absorbing portion being formed of a cut-out portion formed in the resin molded portion and formed at the shoulder portion so that a part of the shoulder portion is not covered by the resin molded portion.

4. A shoulder anchor as claimed in claim 3, further comprising a cover attached to the insertion metal member to cover the cut-out portion.

5. A shoulder anchor used in a seat belt device for guiding a webbing, comprising:

an insertion metal member having a fixing portion to be fixed to a vehicle, a guide hole for allowing the webbing to pass therethrough, a shoulder portion near the guide hole at a side of the fixing portion, and a lower portion situated at a side opposite to the shoulder portion relative to the guide hole, and a resin molded portion molded on at least a predetermined area of the insertion metal member and including a guide portion for guiding the webbing and a shrinkage absorbing portion formed in a part of the guide portion for reducing residual stress of a resin of the resin molded portion, said shrinkage absorbing portion being formed on at least one of the shoulder portion and the lower portion and formed of at least one shrinkage absorbing member disposed in the resin molded portion.

6. A shoulder anchor as claimed in claim 5, wherein said shrinkage absorbing portion includes a cut-out portion formed around the lower portion to completely surround the same, said at least one shrinkage absorbing member being disposed in the cut-out portion.

* * * * *